United States Patent Office 3,248,342
Patented Apr. 26, 1966

3,248,342
PROCESS FOR PREPARATION OF MULTI-COMPONENT CATALYSTS COMPOSITED WITH A SYNTHETIC SILICEOUS CARRIER
George E. Elliott, Jr., Oakmont, and Joseph B. McKinley, New Kensington, Pa., assignors to Gulf Research & Development Company, Pittsburgh, Pa., a corporation of Delaware
No Drawing. Filed Nov. 19, 1962, Ser. No. 238,728
4 Claims. (Cl. 252—442)

This invention relates to improved procedure for preparing a catalyst, to improved procedure for using this catalyst in a hydrocracking process and to the improved catalyst product.

Hydrogenation procedures using multi-component catalysts which include a siliceous base or support are well known. For instance, in hydrocracking the usual catalysts include a siliceous cracking base such as natural or synthetic silica-alumina cracking catalysts as one component and one or more hydrogenating metals, oxides or sulfides such as nickel, cobalt and/or tungsten as another component. Halogens are frequently added to increase cracking activity. The preparation of a complicated catalyst of this type is not a simple matter. For instance, the synthetic cracking base catalysts cannot be formed by extrusion; whereas, those catalysts using a naturally derived silica-alumina cracking catalyst can be extruded with ease. These synthetic based catalysts contain a small amount of alumina as compared with cracking catalysts derived from natural clays and this appears to account for the difference in results on extrusion. While these synthetic based catalysts can be made by tableting, this procedure is more expensive and gives a more dense catalyst.

This invention has for its object to provide extrusion procedure for preparing catalysts containing an iron group metal or mixtures thereof with tungsten composited with a synthetic siliceous cracking base. Another object is to provide improved hydrocracking procedure utilizing a siliceous cracking catalyst composited with an iron group hydrogenation component either alone or mixed or combined with tungsten. Another object is to provide an improved catalyst. Other objects will appear hereinafter.

These and other objects of our invention are accomplished by forming a substantially uniform mixture of extrudable consistency from water, a water soluble compound of an iron group metal and an uncalcined synthetic siliceous support, which support in the calcined state has a high cracking activity and contains between about 65 and 82 percent silica. The mixture thus formed is extruded. The extrusions are dried and calcined to give a hard catalyst pellet containing the desired components and having high activity for hydrocracking and similar reactions. We have found in accordance with our invention that these uncalcined synthetic siliceous bases containing these desired additional components can be extruded to yield a hard catalyst if this procedure is employed. On the other hand, if the preparative mixture does not contain a substantial amount of an iron group metal compound, if the silica content is not regulated within the ranges given, or if a previously calcined siliceous carrier is used, a satisfactory hard catalyst pellet will not be obtained. As indicated above, our invention includes the catalyst resulting from this procedure and a process of hydrocracking in which this catalyst is employed.

The siliceous carrier employed in our invention must be an active cracking catalyst. Especially active catalysts which are particularly useful for hydrocracking can be prepared using a siliceous carrier having a cracking activity index of at least 40 and preferably above 45 when tested in a suitable pelleted or tableted form. (See J. Alexander et al., "Laboratory Method for Determining the Activity of Cracking Catalysts," National Petroleum News, volume 36 [1944], page R–537.) It should also have a large surface area. Thus it is advantageous when preparing such hydrocracking catalysts to employ a siliceous cracking carrier which has a surface area of at least 450 square meters per gram and preferably at least 500 square meters per gram. The siliceous carrier is a synthetic cracking catalyst which contains between about 65 and 82 percent silica (on a calcined basis). Amounts of silica above 82 percent will not give extrudates of satisfactory hardness. Amounts below 65 percent do not involve an extrusion problem, i.e., these lower silica containing carriers can be extruded in the same way as the natural siliceous carriers. The other component of the catalyst carrier comprises one or more of the usual components of a siliceous cracking catalyst such as alumina, magnesia, zirconia, titania and/or thoria. It is advantageous to employ a siliceous catalyst which contains between about 68 and 78 percent silica and the balance being one or more of these secondary components.

The synthetic siliceous cracking support must be uncalcined, i.e., it must still contain appreciable water (associated or combined water) which is characteristic of the gel as originally prepared. This water usually should be present in an amount between about 2 and 25 percent and more especially between 5 and 20 percent. This amount of water is characteristic of incompletely dried or incompletely calcined supports. It is completely removable only by calcining at about 800 to 1000° F.

The hydrogenating component or components of our catalyst may be one or more of the iron group metals, i.e., nickel, cobalt or iron. In the finished catalysts these components may be present as the metals, oxides and/or sulfides. Our invention is also applicable to catalysts which contain one of these iron group metals together with tungsten. The tungsten may be present in the finished catalyst as the oxide and/or sulfide or in combination with one or more of the iron group metals, as, for example, in nickel-tungsten-oxygen or nickel-tungsten-sulfur compounds. Catalysts containing nickel are very amenable to preparation by the process of this invention and are generally more active and thus are usually preferred. The iron group metals are incorporated in the catalyst initially by means of a water soluble compound such as the chloride, acetate, nitrate, sulfate or as an ammine compound in the case of cobalt and nickel. When tungsten is also to be present in the catalyst it may be added to the mixture prior to extrusion, in the form of any water soluble compound of tungsten, in which the tungsten is present in the anion. We prefer to employ ammonium salts of tungstic acid and particularly ammonium meta-tungstate, ammonium tungstate or ammonium silico-dodecatungstate. Ammonium paratungstate may be employed where only small amounts of tungsten are to be incorporated. This salt has a low solubility in water and therefore should not normally be used where it is desired to incorporate large amounts of tungsten. It is advantageous to employ acidic or neutral aqueous solutions when tungsten is to be present. However, usually when the iron group metals only are to be present in the finished catalyst, water soluble salts of these metals in basic solutions may be employed, although acidic or neutral solutions are preferred here also.

The iron group metal should be present in the finished catalyst in amounts between about 2 and 25 percent by weight and preferably between 3 and 15 percent. The tungsten when added should be present in the final catalyst in amounts between about 4 and 35 percent by weight and preferably between about 15 and 25 percent by weight. We have indicated above that the hydrogenating component advantageously should be a water soluble compound. Actually we intend to indicate that the hydrogenating component is substantially soluble in the mixture which in many cases will include a base or an acidic material in addition to water. Furthermore, we have found that although it is preferable to have the hydrogenating components in solution, quite satisfactory catalysts can be prepared from mixtures which contain an iron group compound or tungsten compound (when tungsten also is present) in excess of solubility in the mixture. Therefore it is to be understood that this expression as used herein and in the claims includes these variations.

We have found that the extruding operation and the hardness of the catalyst can be further improved by adding a water soluble compound of fluorine to the mixture prior to extrusion. We have also found that the presence of fluorine is especially advantageous when a substantial amount of tungsten is also present in the catalyst. If fluorine is added it is satisfactory to use any fluorine compound soluble in water or the preparative mixture such as HF; $NH_4F$; $NH_4F \cdot HF$; $H_2SiF_6$ or $HBF_4$. Ordinarily a fluorine containing hydrocracking catalyst should contain between about 0.2 and 3.5 percent by weight of fluorine and preferably between about 1 and 3 percent. For catalysts containing an appreciable amount of tungsten, between about 0.5 and 3.5 percent fluorine is desirable. These percentages are in each case determined as the element. Therefore it is desirable to incorporate the water soluble fluorine compound in the preparation mixture in amounts sufficient to give these percentages of fluorine in the final catalyst.

The siliceous cracking carrier, the iron group metal compound in aqueous solution, the fluorine compound in aqueous solution (when fluorine is employed) and the tungsten compound in aqueous solution (when tungsten is to be present) are mixed or worked together at least until a substantially uniform mixture is obtained. Any known mixing or working device such as a conventional cement mixer, a muller, an extrusion machine, etc., may be employed. The amount of water present after mixing should be such as to give a plastic mass having a consistency which is suitable for extrusion. In the event that excess water was added with the various compounds and the resultant mixture is too fluid, it will be necessary to remove excess water by partial drying. On the other hand, if insufficient water was added, the workability or plasticity of the mixture is adjusted by addition of water. The amount of water to be employed depends on a number of factors such as the particular iron group metal used and the amount thereof and the composition of the siliceous support. Therefore it usually must be determined by trial and error. In general it can be stated that the amount of water present in the plastic mixture prior to extrusion will fall between about 35 and 55 percent by weight. After mixing and/or working to obtain a plastic consistency suitable for extruding the mixture is passed through an extrusion machine and the extrusions broken up or cut into pellets of suitable size. Repeated passage through the extrusion machine may be advantageous to improve the plasticity of the mass and to increase the strength of the catalyst pellets. Any known extrusion procedures and equipment such as described in Chemical Engineering, volume 58, No. 10, pages 166–168 (1951) may be employed.

After extrusion the pellets are dried and calcined. By drying and calcining is meant heating in air or other gas to eliminate water and convert the catalytic components to their high temperature form. The drying and calcining steps can be carried out in the same or different operations or in the same or different atmospheres. If desired the calcined catalyst can be converted to another form by conventional means prior to use. For example, the oxidized form obtained by drying and calcining in air, as was done in preparing the catalysts described below, can be converted to the reduced or metallic state in hydrogen or to the sulfided state in hydrogen plus $H_2S$.

EXAMPLE I

In these tests seventeen catalysts of a variety of compositions were prepared in the oxidized form utilizing the general procedure described for preparing the first catalyst of Example 2 and an uncalcined commercial silica alumina cracking catalyst (American Cyanamid "Triple A") which contained about 75 percent $SiO_2$ on a calcined basis as a cracking component, except for catalyst 14 which used calcined "Triple A" catalyst and except for catalyst 15 which used uncalcined American Cyanamid MS–A catalyst which contained about 87 percent $SiO_2$ on a calcined basis. The resulting catalysts were in the form of 1/8" diameter by 3/16" long extrusions. They were tested for hardness by measuring their side crushing strength. This side crushing strength is the pressure in pounds necessary to crush the extrudate when it is placed on its side between two flat parallel steel surfaces. This side crushing strength is determined on 40 pellets and an average value computed. Also the minimum value is recorded because it is important from practical considerations not to charge even a relatively small percentage of very soft pellets to a reactor. In making the tests the pressure is applied to the steel surfaces pneumatically at a rate of very nearly two-fifths pounds per second. The results are given in Table I.

*Table I*

| Catalyst | Preparation variable | 1000° F. solids content of charge to extruder | Calcined composition | | | Side crushing strength-lbs. | |
|---|---|---|---|---|---|---|---|
| | | | Percent Ni | Percent W | Percent F | Average | Minimum |
| 1 | Standard using $Ni(NO_3)_2$ | 46.2 | 6.0 | 19.0 | 2.0 | 9.3 | 6.7 |
| 2 | Standard using $Ni(NO_3)_2$ but varying the metal content. | 44.0 | 3.6 | 11.4 | 2.0 | 8.9 | 4.6 |
| 3 | ___do___ | 43.4 | 2.9 | 9.1 | 2.0 | 9.3 | 2.3 |
| 4 | ___do___ | 41.1 | 2.4 | 7.6 | 2.0 | 3.7 | 3.1 |
| 5 | ___do___ | 43.3 | 1.5 | 5.0 | 2.0 | 4.7 | 1.0 |
| 6 | Standard using $Ni(NO_3)_2$ but varying the fluorine content. | 49.3 | 6.0 | 19.0 | 0.0 | 1.5 | <1.0 |
| 7 | ___do___ | 44.9 | 6.0 | 19.0 | 0.5 | 2.9 | 1.5 |
| 8 | ___do___ | 46.7 | 6.0 | 19.0 | 1.0 | 5.8 | 3.6 |
| 9 | ___do___ | 46.2 | 6.0 | 19.0 | 2.0 | 9.3 | 6.7 |
| 10 | ___do___ | 48.6 | 6.0 | 19.0 | 3.0 | 6.3 | 3.2 |
| 11 | ___do___ | 43.9 | 6.0 | 19.0 | 4.0 | <1.0 | <1.0 |
| 12 | Standard but tungsten and fluorine only | 46.4 | | 19.0 | 2.0 | 1.5 | 1.0 |
| 13 | Standard nickel and fluorine only | 41.2 | 6.0 | | 2.0 | 7.1 | 4.0 |
| 14 | Standard-calcined triple A | 52.9 | 6.0 | 19.0 | 2.0 | <1.0 | <1.0 |
| 15 | Standard MS–A | 48.1 | 6.0 | 19.0 | 2.0 | <1.0 | <1.0 |
| 16 | Standard but no drying and substantially no mixing. | 47.4 | 6.0 | 19.0 | 2.0 | 8.2 | 2.7 |
| 17 | Standard-nickel only | 42.6 | 6.0 | | | 3.2 | 1.3 |

From the data in Table I it will be evident that a catalyst varying greatly in metal content can be satisfactorily prepared by our procedure (catalysts 1 to 5, inclusive). It will also be apparent from catalysts 6 to 11, inclusive that fluorine in amounts of between 0.2 and 3.5 percent greatly improved the strength of the catalyst, especially when tungsten is present. Catalysts 12 and 13 illustrate the important effect of the iron group metal on strength of the catalyst. Tests 14, 15 and 16 give data on the hardness of the finished catalyst when using a calcined carrier from which water is initially entirely removed (test 14); when the carrier contains an excessive amount of silica (test 15); and when there is not extensive working prior to extrusion (test 16). Test 17 indicates that our improved procedure can be employed to prepare an iron group catalyst which does not contain fluorine. This catalyst could be further improved by repassing through the extrusion machine prior to drying and calcining so that it had a side crushing strength of 7.7 pounds.

While the catalyst of our invention may be used in various hydrogen treatment processes such as reforming and isomerization, it is of particular value in connection with hydrocracking procedures, and this aspect of our invention will now be described in detail. Our catalyst may be applied to the hydrocracking of any liquid hydrocarbon fraction. Thus our catalyst is applicable to the hydrocracking of heavy naphthas to obtain high octane gasoline. Our invention is also applicable to the hydrocracking of kerosene, furnace oil, gas oil, deasphalted residuum whether straight-run or cracked and distillate shale oils. Also our catalyst is applicable to the hydrocracking of high aromatic stocks such as solvent extracts or catalytically cracked cycle stocks. Furthermore, it is applicable to the preparation of improved lubricating oils by a controlled hydrocracking operation to improve color, iodine number, carbon residue and/or viscosity index. Such procedure is described in Beuther et al. Patent 2,960,458, November 15, 1960, to which reference is made for further details as to the method of treatment and reaction conditions employed.

The nitrogenous impurities present in the feed stocks are known to have an undesirable effect on hydrocracking catalysts, particularly if carried out in the lower portions of the temperature ranges usually employed. It is therefore advantageous to remove nitrogen impurities if a low temperature is to be employed in the hydrocracking operation. This can be accomplished using any nitrogen reduction procedure.

The hydrocarbon to be hydrocracked is contacted with the above described catalyst in the presence of hydrogen under hydrocracking conditions. A temperature of between about 450° and 950° F. may be employed. A temperature of between about 600° and 800° F. is advantageous for a feed stock having a low nitrogen content. This low nitrogen feed will usually be prepared in a prehydrogenation stage in known fashion. A higher temperature of 700° to 850° F. is advantageous for a more impure feed containing a higher amount of nitrogen. This last mentioned high temperature operation would not usually be preceded by any purification so that this operation could be a single stage hydrocracking process. A hydrogen partial pressure of between about 200 and 5000 p.s.i. is ordinarily employed. Although higher pressures may be used, the high cost of producing such high pressures and the excessive cost of high pressure equipment offsets any advantages thereof. A pressure of between about 2000 and 5000 is advantageous when impure feeds high in nitrogen, i.e., above about 25 p.p.m. are treated. A hydrogen partial pressure of between about 500 and 2000 is advantageous for treatment of feeds which are low in nitrogen, i.e., below about 25 p.p.m. and preferably below about 10 p.p.m. A hydrogen recycle rate of between about 1000 and 30,000 s.c.f./bbl. of feed and preferably between about 2000 and 15,000 s.c.f./bbl. of feed is employed. A space velocity of between about 0.1 and 15 and preferably between about 0.5 and 5 is employed. Our improved catalyst can be regenerated by combustion in the usual fashion and such regeneration will result in elimination of harmful compounds such as nitrogen compounds and the poisoning effect thereof.

EXAMPLE II

A first catalyst was prepared in accordance with our invention by wetting 1,356 parts by weight of as-received, uncalcined American Cyanamid Triple A grade silica-alumina with 2,345 parts by weight of a solution containing 440 parts by weight of ammonium meta-tungstate, 427 parts by weight nickel nitrate hexahydrate and 31.2 parts by weight hydrogen fluoride. The resulting medium paste was worked in a 12" "Cincinnati Muller" (manufactured by the International Clay Machinery Co. of Dayton, Ohio), for about 2½ hours and dried to a solid content upon ignition in air at 1000° F. of 46 weight percent. The resulting paste was then extruded twice, using a "California Laboratory Pellet Mill" (manufactured by the California Pellet Mill Co. of San Francisco, California), into extrudates of ⅛ inch diameter and ⅛ to 3/16 inch in length. These extrudates were dried at 250° F. for 24 hours, heated up to 1000° F. in six hours, and calcined at 1000° F. for ten hours. Analysis indicated the presence of 5 weight percent nickel, 21 weight percent tungsten and 1.7 weight percent fluorine. The extrudates were crushed and sized to provide a sample in the 6–14 mesh size range which was sulfided by treating for six hours in a stream of an equivolume mixture of hydrogen and hydrogen sulfide at 600° F. and 15 p.s.i.g. The catalyst then had a surface area of 218 square meters per gram, a pore volume of 0.30 cubic centimeter per gram, a pore diameter of 55 Angstroms, and a density of 0.81 gram per cubic centimeter.

A second catalyst was prepared in accordance with a conventional prior art tableting procedure by mixing as-received, uncalcined American Cyanamid Triple A grade silica-alumina with 2 percent Acro Wax C (Glyco Products Co.) and 5 percent Elvanol, Grade 71–30 (E. I. du Pont de Nemours and Co.), as lubricant and binder respectively and forming into 3/16-inch tablets using a Stokes tableting machine. The tablets were heated up to 1000° F. in six hours, calcined at 1000° F. for about 14 hours, and crushed and sized to provide a sample in the 6–14 mesh size range. 3,191 parts by weight of the sized material was immersed for fifteen minutes in 5,260 parts by weight of an aqueous solution containing 3.1 weight percent hydrogen fluoride. This impregnated material was recovered from excess impregnating solution, dried at 250° F. for 24 hours, heated up to 1000° F. in six hours and calcined at 1000° F. for ten hours. 3,109 parts by weight of this fluorided support was then immersed for fifteen minutes in 9,400 parts by weight of an aqueous solution containing 2,145 parts by weight of ammonium meta-tungstate, and 2,235 parts by weight nickel nitrate hexahydrate. The impregnated material was recovered from excess impregnating solution, dried at 250° F. for 24 hours, heated up to 1000° F. in six hours and calcined at 1000° F. for ten hours. Analysis indicated that it contained 4 weight percent nickel, 20 weight percent tungsten and 2.0 weight percent fluorine. The catalyst was sulfided for six hours with an equivolume mixture of hydrogen and hydrogen sulfide at 600° F. and 15 p.s.i.g. It then had a surface area of 129 square meters per gram, a pore volume of 0.21 cubic centimeter per gram, a pore diameter of 66 Angstroms, and a density of 0.96 gram per cubic centimeter.

The two catalysts were compared for the downflow hydroprocessing of an Ordovician deasphalted residuum which had a 96 viscosity index, a 24° API gravity and a 161 Saybolt viscosity at 100° F. The comparison was made at 3,530 p.s.i.g., 0.5 volume of deasphalted feed per volume of catalyst per hour, 5,000 standard cubic feet of 95 percent or better hydrogen per barrel of feed and at 754–757° F. Each catalyst gave a yield of 50 percent by weight of charge of 725° F. initial boiling point dewaxed lubricating oil base stock of 120 viscosity index and a 100° F. Saybolt viscosity of 335 to 340. However, because of the lower density of the extruded catalyst (0.81 g./cc. versus 0.96 g./cc.) this result was obtained with approximately 15 percent less catalyst when the extruded catalyst was employed. This represents an important consideration because catalysts are bought on a per pound basis. Thus a charge of the extruded catalyst to give results equivalent to those of the conventionally made tableted catalyst would cost about 15 percent less on just a difference in density basis alone. Also catalyst manufacture by extrusion is cheaper than manufacturing by tableting.

We claim:

1. In a method for preparing a catalyst comprising a member of the group consisting of iron group metals, oxides and sulfides composited with a synthetic siliceous carrier having high cracking activity, the improvement which comprises admixing water, a water soluble compound of an iron group metal, and an uncalcined synthetic siliceous support, which support in the calcined state has a high cracking activity and contains between about 65 and 82 percent silica, working together the admixture to form a substantially uniform mixture of extrudable consistency, extruding the mixture and drying and calcining the extrusions.

2. In a method for preparing a catalyst comprising a member of the group consisting of iron group metals, oxides and sulfides, combined fluorine and a synthetic siliceous carrier of high cracking activity, the improvement which comprises admixing water, a water soluble compound of an iron group metal, a water soluble fluorine compound in an amount corresponding to between about 0.2 and 3.5 percent of fluorine in the finished catalyst, and an uncalcined synthetic siliceous support, which support in the calcined state has a high cracking activity and contains between about 65 and 82 percent silica, working together the admixture to form a substantially uniform mixture of extrudable consistency, extruding the mixture and drying and calcining the extrusions.

3. In a method for preparing a catalyst comprising a member of the group consisting of nickel, oxides and sulfides thereof, combined fluorine and a synthetic siliceous carrier having high cracking activity, the improvement which comprises admixing water, a water soluble compound of nickel, a water soluble fluorine compound in an amount corresponding to between 0.2 and 3.5 percent of fluorine in the finished catalyst and an uncalcined synthetic siliceous support, which support in the calcined state has a high cracking activity and contains between about 65 and 82 percent silica, working together the admixture to form a substantially uniform mixture of extrudable consistency, extruding the mixture and drying and calcining the extrusions.

4. In a method for preparing a catalyst comprising a member of the group consisting of nickel, oxides and sulfides thereof, composited with a tungsten compound, combined fluorine and a synthetic silica-alumina carrier having high cracking activity, the improvement which comprises admixing water, a water soluble compound of nickel, a water soluble compound of tungsten, a water soluble compound of fluorine in an amount corresponding to 0.5 to 3.5 percent of fluorine in the finished catalyst and an uncalcined synthetic silica-alumina support, which support in the calcined state has a high cracking activity and contains between about 65 and 82 percent silica, working together the admixture to form a substantially uniform mixture of extrudable consistency, extruding the mixture and drying and calcining the extrusions.

References Cited by the Examiner

UNITED STATES PATENTS 2,310,278  2/1943  Connolly _____ 208—111
2,356,576  8/1944  Free et al. _____ 208—111

BENJAMIN HENKIN, *Primary Examiner.*

ALPHONSO D. SULLIVAN, MAURICE A. BRINDISI,
*Examiners.*